Oct. 17, 1961     E. J. HERBENAR     3,004,786
BALL JOINT
Filed July 30, 1958
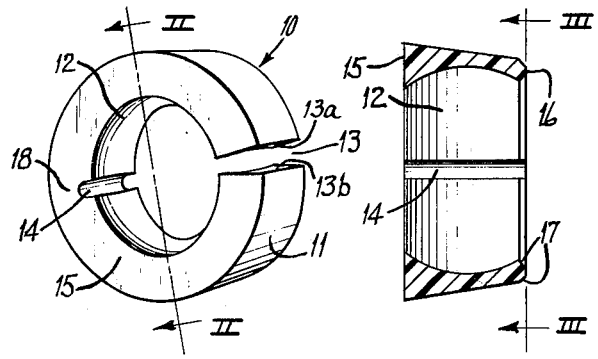
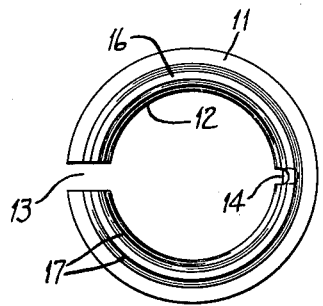
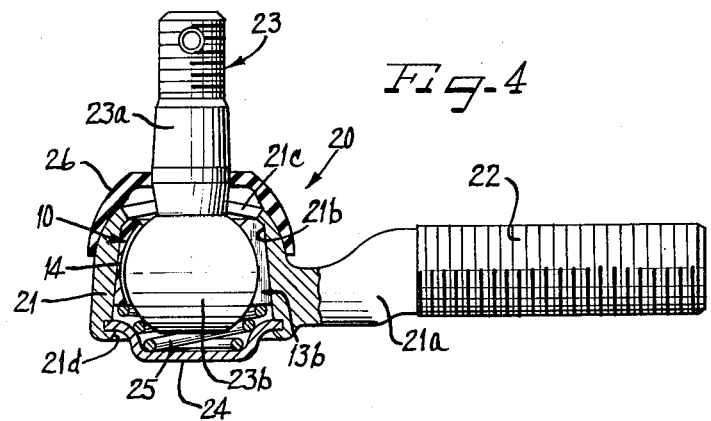
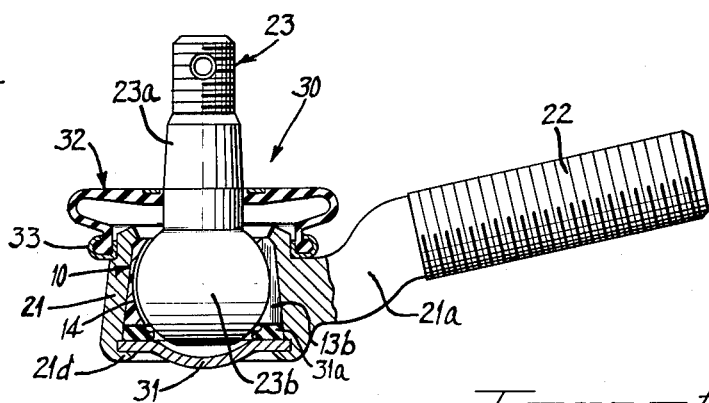
Inventor
Edward J. Herbenar

# United States Patent Office 3,004,786
Patented Oct. 17, 1961

3,004,786
BALL JOINT
Edward J. Herbenar, Detroit, Mich., assignor to Thompson Ramo Wooldridge Inc., a corporation of Ohio
Filed July 30, 1958, Ser. No. 752,011
9 Claims. (Cl. 287—90)

This invention relates to joint assemblies of the ball joint type used in tie rod connections and the like. More particularly, this invention relates to a ball joint assembly having a grooved bearing member to provide a permanently lubricated joint assembly.

The present invention has particular reference to an improved bearing member to be interposed between the ball stud and the walls of its associated socket in a ball joint assembly. While there are numerous types of bearings described in the art for this particular purpose, for the most part, these bearing assemblies are difficult and expensive to manufacture so that the cost of the bearing is a very significant part of the cost of the ball joint assembly. Furthermore, although attempts have in the past been made to provide a ball joint assembly wherein the bearing member is permanently or semi-permanently lubricated so that the lubricant can be packed in the assembly in manufacture and need not thereafter be replaced during use, none of these prior art attempts to provide a permanently lubricated assembly have in practice been entirely satisfactory.

The ball joint assembly of the present invention has several distinct advantages. From the manufacturing standpoint, the bearing employed in the ball joint assembly is extremely simple to manufacture and to insert into the housing during the assembly of the ball joint. Furthermore, the nature of the bearing assembly permits a single lubrication of the joint to last for the life of the joint, thereby eliminating the necessity of providing a lubrication fitting in each ball joint. Further, the bearing assemblies are quite rugged and will normally last at least as long as the other elements of the joint assembly.

The joint assembly of the present invention provides a simplified construction which at the same time achieves the above noted desired operating characteristics and affords a permanently lubricated joint. In a preferred form of the invention, the joint consists of a socket having a substantially frusto-conical inner wall and a sleeve-like bearing member of complementary substantially frusto-conical outer shape adapted to be inserted into the socket to form a bearing lining between the inner socket wall and the head of the ball stud. The bearing element according to this invention is of a cleft sleeve construction and is composed of a semi-resilient composition such as nylon or any other suitable synthetic resinous material of the semi-resilient type. A groove or recess is provided on the inner surface of the bearing member opposite the cleft thereof. This inner surface of the bearing member preferably has the shape generally of a major zone of the surface of a sphere so that the bearing member may be sprung open by means of its cleft construction and slipped snugly over the ball to be received therein in assembly. The recess on the inner surface serves not only to provide a wall portion of reduced thickness to increase the resiliency and facilitate assembly by a spring hinge action, but also provides a channel in which a lubricant is packed and sealed into the completed assembly.

With the foregoing in mind, it is an object of the present invention to provide an improved ball joint assembly, and, in particular, an improved bearing member for use in such ball joint assemblies.

It is a further object of this invention to provide an inexpensive ball joint assembly which is provided with means to receive a permanent lubrication and thereby eliminate the necessity of providing lubrication fittings.

It is another object of the present invention to provide an improved ball joint assembly containing a simplified but highly effective bearing means which can be readily inserted into the housing and which will function effectively for the life of the joint.

It is a further object of this invention to provide an improved bearing member for a ball joint assembly.

Other objects, features, and advantages of the present invention will be more fully apparent from the following detailed description given in connection with the accompanying drawings in which like reference characters refer to like parts throughout and wherein:

FIGURE 1 is a perspective view of the bearing member of the present invention.

FIGURE 2 is a longitudinal sectional view taken on the line II—II of FIGURE 1.

FIGURE 3 is an end elevational view looking in the direction of the arrows III—III of FIGURE 2.

FIGURE 4 is a sectional view of one embodiment of a ball joint assembly including the bearing member of FIGURE 1.

FIGURE 5 is a sectional view of a second embodiment of a ball joint assembly including the bearing member of FIGURE 1.

Turning now to the drawings and in particular to FIGURES 1, 2, and 3 thereof, there is shown a bearing member 10 preferably composed of a synthetic resinous polyamide material such as the material commercially known as "Nylon" or any similar material such as "Vulcalon," "Rilsan," "Teflon," etc. In general, the material should preferably be a synthetic resinous polymer which is at least semi-resilient and which in its molded form affords a tough wear resistant surface.

The outer surface of the bearing member 10 is generally of a frusto-conical shape and has a slanting side wall 11 which tapers upwardly from an annular bottom wall 15 to an annular top wall 16 which may have beveled edges 17. The bearing member 10 is in effect a cleft sleeve, the surface 12 of the hollow interior of which is formed generally in the shape of a major zone of the surface of a sphere to envelop a substantially full ball end of a ball stud. The sleeve bearing member 10 has a cleft 13 in its side wall 11 extending along the entire length of the sleeve. Diametrically opposite this cleft 13 there is a recess or slot 14 in the inner surface 12. Both the cleft 13 and the slot 14 preferably extend from the bottom to the top of the side wall in a direction parallel to the vertical axis of the frusto-conical bearing member. The cleft 13 and slot or recess 14 are disposed opposite each other, that is to say, they are so disposed that a common diameter of the spherical inner surface 12 passes through both the cleft 13 and slot 14.

The slot 14 not only serves as a channel for the storage and flow of lubricant in the assembled joint, in a manner to be described below, but also results in a portion 18 of the side wall 11 being of reduced thickness so as to afford a greater resiliency so that the cleft sleeve may be expanded to fit over the ball adapted to be received therein and may then in operation be contracted so that the two surfaces 13a and 13b of the cleft move closer together to form a bearing member around the ball contained therein. The cleft gap accommodates further contraction of the bearing to compensate for wear of the bearing walls and also provides another lubricant groove. The load capacity required of the bearing determines the necessary thickness of this thinnest wall point 18 for any given material.

In FIGURE 4 reference numeral 20 indicates generally a tie rod joint which includes a socket 21 having a laterally extended threaded shank portion 21a for threaded engagement into the end of a tie rod assembly 22. The socket 21 includes a generally frusto-conical cavity 21b and in its upper portion is provided with an aperture 21c which freely receives the shank portion 23a of a stud generally indicated at numeral 23.

A closure plate 24 closes the bottom of the cavity 21b and the socket 21 has a peened over portion 21d which tightly receives the peripheral edge of the closure plate. The stud 23 has a segmental spherical ball portion 23b providing a substantially full ball end which is received within the bearing member 10 in the socket 21. The bearing 10 envelops the ball end portion 23b beyond both sides of the great circle or major diameter of the ball end and in complementary fitting relation therewith and is resiliently supported above the cover plate 24 by a spring 25. As the spring urges the tapered bearing member upwardly in the socket, the cleft gap tends to decrease in width and the bearing member is snugly fitted about the ball. The bearing member is so dimensioned with respect to the ball, however, that initially, the gap is not full closed but remains partially open to provide another lubricant channel. In use, as the ball or the inner spherical surface of the bearing member wear away, the spring urges member 10 further upwardly to further contract the cleft gap and thus accommodate for this wear. A seal or dust cover 26 which may be of rubber or any other flexible or deformable material surrounds the shank 23a of stud 23 and is fitted over the socket 21 by a friction or tight slip fit.

In assembling the ball joint 20, the bearing member 10 may first be snapped over the ball 23b by expanding its cleft portion and sliding it into position so that the inner spherical surface of the bearing member mates with the outer spherical surface of the ball. The stud 23 is then passed upwardly through the socket 21 and through the seal 26. The outer frusto-conical surface of the bearing member 10 mates with the inner frusto-conical surface of the socket 21. As the tapered frusto-conical bearing member 10 is forced and wedged further and further upwardly into the socket 21 the bearing member is compressed so that the surfaces 13a and 13b of the cleft 13 in the bearing member 10 are brought near together to form the second lubricant channel.

Any desired grease or other lubricant is then introduced through the recess 14 and the cleft gap in the bearing member 10 and will fill these recesses and the other voids in the sealed socket 21. The spring 25 is then placed in position and cap or closure member 24 is sealed into the assembly by peening over the surfaces 21d. The spring 25 urges the bearing member 10 upwardly in the socket 21 thereby urging the cleft together to afford the above noted wear take-up action.

While it has been found that adequate lubricating action may be achieved through the use of a cleft and a single groove or slot such as the groove 14, it will of course be apparent that if desired a larger number of such slots could be used in virtually any desired pattern. That is to say, one or more slots may run vertically along the slant wall 11 of the bearing member 10 as shown in FIGURE 1, or a slot could run peripherally around this inner surface at right angles to the slot 14 to conduct lubricant to other portions of the ball member 23d.

In FIGURE 5 there is shown a ball joint assembly 30 which is generally similar to that shown in FIGURE 4 and which also includes the bearing member 10 used in essentially the same manner as in the joint assembly 20 of FIGURE 4. In FIGURE 5, however, there is provided a rubber block 31a and a rubber closure plate 31 in place of the spring 25 and closure plate 24 shown in FIGURE 4. Member 31 may be held in position by peened over portion 21d and resiliently supports the bearing member 10. It will also be noted that the rubber seal member 26 shown in FIGURE 4 has been replaced by a differently shaped rubber seal member 32 which is attached to the socket 21 by fingers 33 projecting integrally from socket 21.

In both FIGURES 4 and 5 it will be noted that the gap or cleft 13 is urged closed by the wedge fit of the tapered or frusto-conical bearing member 10 in the socket 21 and that the groove 14 remains open after the bearing member is fitted into the socket so that lubricant may be fed through the gap and the slot to the assembly already sealed at one end. When the lubricant has been thus packed, the other end is closed either by a rubber plate member such as the block 31 which supports the bearing member 10 directly or by the spring 25 and closure plate 25 as shown in FIGURE 4. Either of these closure members or any equivalent closure members may thus permanently seal the lubricated ball joint assembly so that the initial packing of lubricant will last throughout the lifetime of the ball joint assembly.

While a preferred exemplary embodiment of the invention has now been described, it will be understood that modifications and variations may be effected therein without departing from the spirit and scope of the novel concepts of the present invention as defined by the following claims.

I claim as my invention:

1. A bearing member for a ball joint assembly, said bearing member comprising a cleft sleeve of integral unitary construction formed of a resilient synthetic resinous polymer, the outer surface of said sleeve having a generally frusto-conical shape, the inner surface of said sleeve being generally a zone of a sphere adapted to receive a ball, and a recess on said inner surface adapted to receive a lubricant to be sealed into said assembly, said recess and said cleft being oppositely disposed so that both are intersected by a common diameter of said spherical inner surface.

2. A bearing member for a ball joint assembly, said bearing member comprising a cleft sleeve formed of a resilient material, the outer surface of said sleeve having a generally frusto-conical shape, said cleft extending along the slant wall of said frusto-conical sleeve from bottom to top thereof, the inner surface of said sleeve being generally a zone of a sphere adapted to receive a ball, and a recess on said inner surface adapted to receive a lubricant to be sealed into said assembly, said recess being disposed opposite said cleft so that said recess and said cleft are both intersected by a common diameter of said spherical inner surface.

3. A bearing member for a ball joint assembly, said bearing member comprising a cleft sleeve formed of a resilient synthetic resinous polymer, the outer surface of said sleeve having a generally frusto-conical shape, said cleft extending in a common plane with the axis of said frusto-conical shape along the slant wall of said sleeve from bottom to top thereof, the inner surface of said sleeve being generally a zone of a sphere adapted to receive a ball, a recess on said inner surface adapted to receive a lubricant to be sealed into said assembly, said recess extending in said common plane with the axis of said frusto-conical outer surface and said cleft, said recess and said cleft being oppositely disposed so that both are intersected by a common diameter of said spherical inner surface.

4. A permanently lubricated ball joint construction comprising a socket having a substantially frusto-conical inner wall, first and second apertures at opposite ends of said socket, a ball and stud having a shank portion extending through said first aperture, a cleft sleeve bearing member interposed between the ball of said ball stud and said socket, said bearing member being formed of a resilient synthetic resinous polymer, the outer surface of said sleeve having a generally frusto-conical shape mating with the inner surface of said socket, said cleft extending in a common plane with the axis of said frusto-conical shape along the slant wall of said sleeve from bottom to top thereof, the inner surface of said sleeve being generally a zone of a sphere mating with the outer surface of said ball, a recess on said inner surface of said sleeve adapted to receive a lubricant to be sealed into said assembly, said recess extending in said common plane with the axis of said frusto-conical outer surface and with said cleft, said recess and said cleft being oppositely disposed so that both are intersected by a common diameter of said spherical inner surface, a deformable sealing member snugly surrounding the shank of said ball stud and engaging the outer surface of said socket, a lubricant in said joint assembly, said lubricant being prevented from escaping from said assembly through said first aperture by said sealing member, and a closure member connected to said socket and closing said second aperture to prevent the escape of said lubricant therethrough.

5. A permanently lubricated ball joint construction comprising a socket having a substantially frusto-conical inner wall, a ball stud, a bearing member receiving the ball of said stud and interposed between said ball and said socket, said bearing member comprising a cleft sleeve formed of resilient synthetic resinous material, the outer surface of said sleeve having a generally frusto-conical shape and mating with the inner surface of said socket, the inner surface of said sleeve being generally a zone of a sphere and mating with the outer surface of said ball so that said cleft is maintained open and said ball is snugly received within said bearing member, a recess on the inner surface of said sleeve, said recess and said cleft both extending in a common plane with the axis of said frusto-conical outer surface, said recess and said cleft being oppositely disposed so that both are intersected by a common diameter of said spherical inner surface, a lubricant in said cleft and in said recess, a deformable closure member surrounding the shank of said ball stud and engaging the end of said socket, a second closure member attached to the other end of said socket, said closure members permanently sealing said lubricant into said joint assembly, and means urging said bearing upwardly in said socket so that further closure of said cleft gap will accommodate wear of said bearing and maintain said bearing in snugly fitted relation to said ball.

6. A ball joint construction comprising a housing with a closed end cavity converging toward an opening in the opposite end, a ball stud having a substantially full ball end in the cavity and a shank projecting freely from the cavity through said opening, a longitudinally cleft molded nylon sleeve in said cavity having an outer periphery converging in the same direction as the cavity and seated on the cavity wall in longitudinal shifting relation therewith, the cleft in said sleeve extending through the entire length of the sleeve, said sleeve having a spherical hollow interior complementary in shape with the ball end of the ball stud and enveloping the ball end of the stud except at a narrow gap along the entire length of the sleeve provided by said cleft and said hollow interior extending beyond both sides of the great circle of the ball end, spring means between the sleeve and closed end of the cavity urging the sleeve longitudinally in the direction of convergence of the cavity wall and outer sleeve periphery and toward said opening of the cavity for decreasing the width of the cleft gap to contract the sleeve around the ball end of the stud into good bearing relation therewith, and said molded nylon being sufficiently resilient to be sprung over the ball end of the stud during assembly of the stud in the sleeve.

7. A ball joint construction comprising a housing with a closed end cavity converging toward an opening in the opposite end, a ball stud having a substantially full ball end in the cavity and a shank projecting freely through the cavity opening, a longitudinally cleft molded synthetic resin sleeve in the cavity in longitudinal shifting relation having the cleft extending through the full length thereof and an outer periphery seated on the cavity wall and converging in the same direction toward said opening, said sleeve having a spherical hollow interior defining the major zone of a sphere and enveloping the substantially full ball end of the stud except at a narrow gap provided by the cleft and extending beyond both sides of the great circle of the ball end, said sleeve having a longitudinally extending recess in the spherical hollow interior thereof remote from the cleft of the sleeve and providing a reduced thickness sleeve portion acting as a spring hinge to facilitate springing of the sleeve over the ball end of the stud, said recess and said cleft gap providing lubricant channels for supplying lubricant to the ball end of the stud, and spring means compression loaded between the closed end of the cavity and the sleeve urging the sleeve toward the cavity opening in the direction of convergence of the cavity wall and the sleeve periphery for decreasing the width of the cleft gap to maintain the sleeve in good bearing contact with the ball end of the stud.

8. A bearing for a ball joint or the like which comprises a molded synthetic resin longitudinally cleft sleeve with a longitudinally converging outer periphery and a spherically shaped hollow interior of sufficient extent to envelop a sphere on both sides of the great circle thereof, said hollow interior being complementary in shape with the sphere enveloped thereby, said sleeve having a cleft gap along the entire length thereof and being sufficiently resilient to be sprung over a sphere in snug fitting engagement therewith while leaving a narrow gap along the cleft thereof, and said sleeve periphery adapted to be wedge fitted in longitudinally shifting relation in a housing for decreasing the width of the gap to contract the hollow interior of the sleeve for maintaining snug seating engagement between an inserted sphere and the spherically shaped hollow interior of the sleeve.

9. A bearing for a ball joint or the like which comprises a molded resin longitudinally cleft sleeve with an outer periphery converging along the length of the sleeve toward one end of the sleeve and with a spherically shaped hollow interior of sufficient extent to envelop a sphere on both sides of the great circle thereof, said hollow interior being complementary in shape with the sphere enveloped thereby, the cleft of said sleeve extending along the full length thereof, said converging outer periphery of the sleeve effecting contraction of the sleeve and a decrease in the width of the cleft gap when the sleeve is urged in the direction of convergence in engagement with a complementary surrounding wall, and said sleeve having a longitudinally extending groove in the interior thereof remote from the cleft portion thereof and forming a reduced thickness sleeve portion providing a spring hinge to facilitate springing of the sleeve around a sphere.

References Cited in the file of this patent

UNITED STATES PATENTS

| 2,288,160 | Flumerfelt | June 30, 1942 |
| 2,451,060 | Booth | Oct. 12, 1948 |
| 2,507,087 | Booth | May 9, 1950 |
| 2,715,766 | Ricks | Aug. 23, 1955 |
| 2,841,428 | Moskovitz | July 1, 1958 |
| 2,845,290 | Latzen | July 29, 1958 |

FOREIGN PATENTS

| 737,811 | Great Britain | Oct. 5, 1955 |
| 1,014,441 | Germany | Aug. 22, 1957 |
| 1,094,242 | France | Dec. 1, 1954 |